INVENTOR.
MONTAGUE H. DUVAL
BY CARL M. VITZ
Otto Moeller
Attorney.

INVENTOR.
MONTAGUE H. DUVAL
BY CARL M. VITZ

Otto Moeller
Attorney

INVENTOR.
MONTAGUE H. DUVAL
BY CARL M. VITZ

Otto Moeller
Attorney

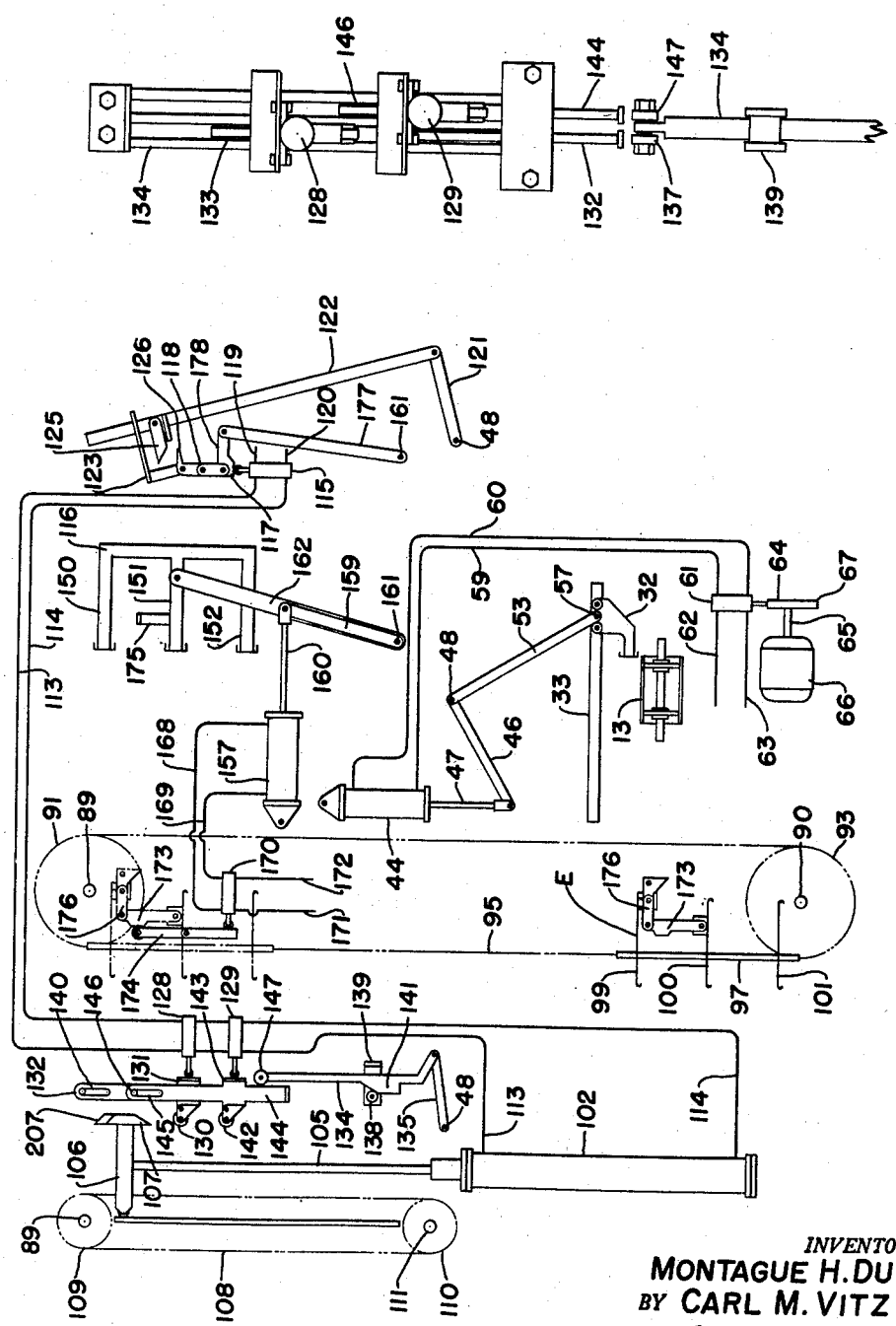

United States Patent Office 2,849,100
Patented Aug. 26, 1958

2,849,100

ARTICLE TRANSPORTING APPARATUS

Montague H. Duval, New York, N. Y., and Carl M. Vitz, York, Pa., assignors, by mesne assignments, to Capitol Products Corporation, Mechanicsburg, Pa., a corporation of Pennsylvania Original application November 15, 1951, Serial No. 256,436, now Patent No. 2,741,384, dated April 10, 1956. Divided and this application August 25, 1955, Serial No. 530,466

4 Claims. (Cl. 198—34)

This invention relates generally to article handling and conveying apparatus and, more particularly, to an apparatus for periodically transferring articles, being transported by a conveyor, onto another conveyor in segregated rows of a predetermined number of articles, loading successive segregated rows onto an elevator and unloading the articles at a different elevation in rows onto a receiver.

The present invention is of particular utility in the bakery industry in the handling of bread after it comes from the oven and has been depanned. It is customary to arrange the depanned bread on racks for air cooling or to deliver it to the conveyors of a bread cooler of one kind or another, as for example, a bread cooler such as is disclosed in U. S. Patent 2,171,922. For purpose of illustration, the invention is shown and described as applied to a bread cooler with the bread being delivered to the several superposed conveyor paths in successive rows.

An important feature is to provide a conveying system for presenting articles in position to be pushed on an elevator or other carrier in successive rows of the required or desired number of articles in a row, and which includes means for uniformly spacing the individual articles of a row and for periodically presenting a row at a time. In other words the articles, for example loaves of bread after being depanned, are conveyed in a single file on a continuously traveling conveyor. These loaves are haphazardly spaced and some may be in actual contact with each other. In treating the hot loaves in the tunnel of a cooler and conditioner, it is desirable, in order to handle a maximum number of loaves in a minimum of space and at the same time obtain most efficient cooling and effect other economies, to convey the loaves through the tunnel in successive rows of four, ten, sixteen, or any other suitable number of loaves, and to space the individual loaves of each row a uniformly small distance apart. In its more specific aspects the present invention, therefore, contemplates novel means for arranging the haphazardly delivered loaves in successive segregated rows of a desired number of loaves in position to be pushed onto an elevator or other carrier, with the individual loaves of each row in uniform spaced relation with respect to each other.

Another object is to provide a conveying system as aforesaid and a transferring system comprising an elevator with a loader for pushing the rows of articles, presented by the conveying system, onto at least one tray and preferably successively to a plurality of trays of the elevator, and wherein the loading pusher controls the operation of the conveying system to present a row of articles after each operation of the pusher.

Further objects and advantages of the invention will appear from the following description and from the drawings, which are intended for the purpose of illustration only, and in which Figure 1 is a view of the invention in end elevation;

Figure 5 is a diagrammatic view of the various elements of the invention;

Figure 8 is a fragmentary elevational view of valve and valve operating mechanism shown in Figure 3A;

Figures 2, 2A:
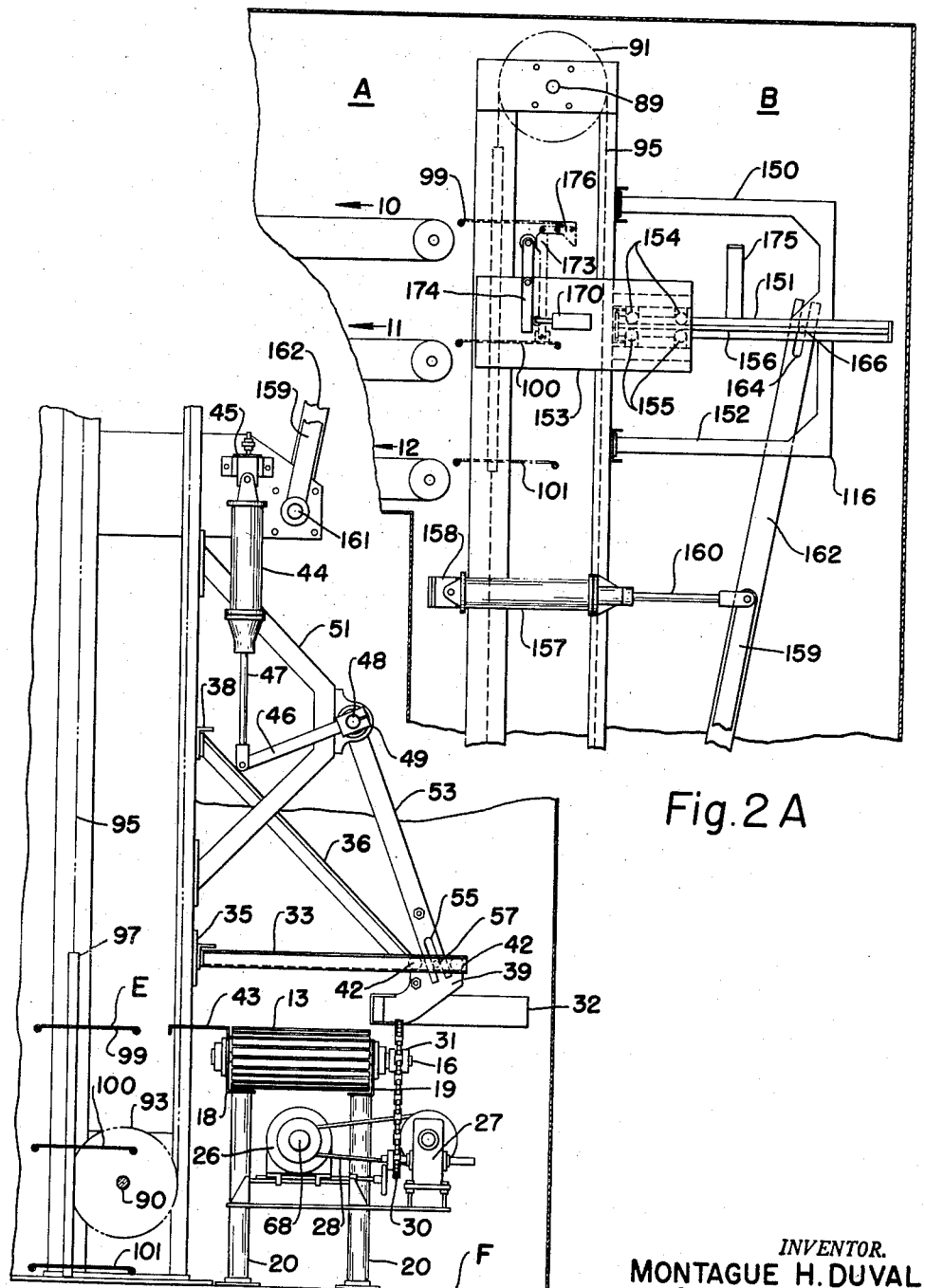
Figures 2 and 2A are side elevations as viewed from the left in Figure 1 with the elevator trays and the enclosing casing shown in section.
Figure 3A:
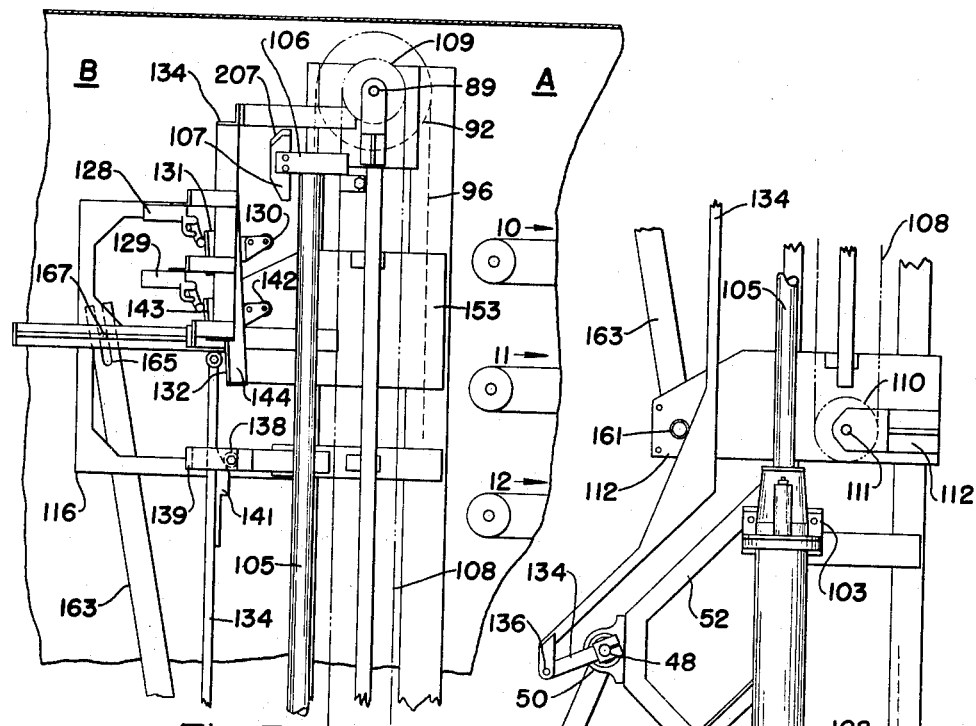
Figures 3 and 3A are side elevations as viewed from the right in Figure 1 with the enclosing casing shown in section.

In the drawings, the invention is shown as applied to a bread cooler and conditioner which includes a longitudinally extending tunnel A, Figures 2A and 3A, preferably rectangular in transverse cross section, and in which are disposed a number of horizontally disposed endless conveyors 10, 11 and 12 arranged in superposed relation, with the top or bread carrying run traveling in the direction of the arrows. Since the invention is primarily concerned with the infeed end of the bread cooler and conditioner, only the bread receiving end portion of the tunnel A is shown.

The tunnel A may be provided with suitable cooling and air conditioning means, well known in the art, in order to condition the bread for delivery to the slicing and wrapping machine, or the tunnel A may constitute a tempering chamber for partially cooling the loaves followed by final complete cooling in a vacuum zone, as in Patent No. 2,171,922 issued September 5, 1939 to M. H. Duval et al.

The endless conveyors 10, 11 and 12, or other suitable means, for conveying the loaves through the tunnel A, are of a width to accommodate a plurality of loaves abreast, ten for example. In Figures 2A and 3A there are shown three conveyors 10, 11 and 12, however any desired number of conveyors may be employed, the feeding means being suitably modified to accommodate the number of conveyors. By providing a plurality of superposed conveyors, each adapted to receive successive rows of loaves ten abreast, it will be appreciated that a maximum number of loaves per unit of space may be handled.

The bread cooler and conditioner is provided at the infeed end of the tunnel A with an upright chamber B housing the means for feeding the hot loaves to the conveyors 10, 11 and 12. The tunnel A is preferably supported in a somewhat elevated position above the floor F, while the chamber B rests on the floor F and has its upper portion opening to the tunnel A.

Figure 1:
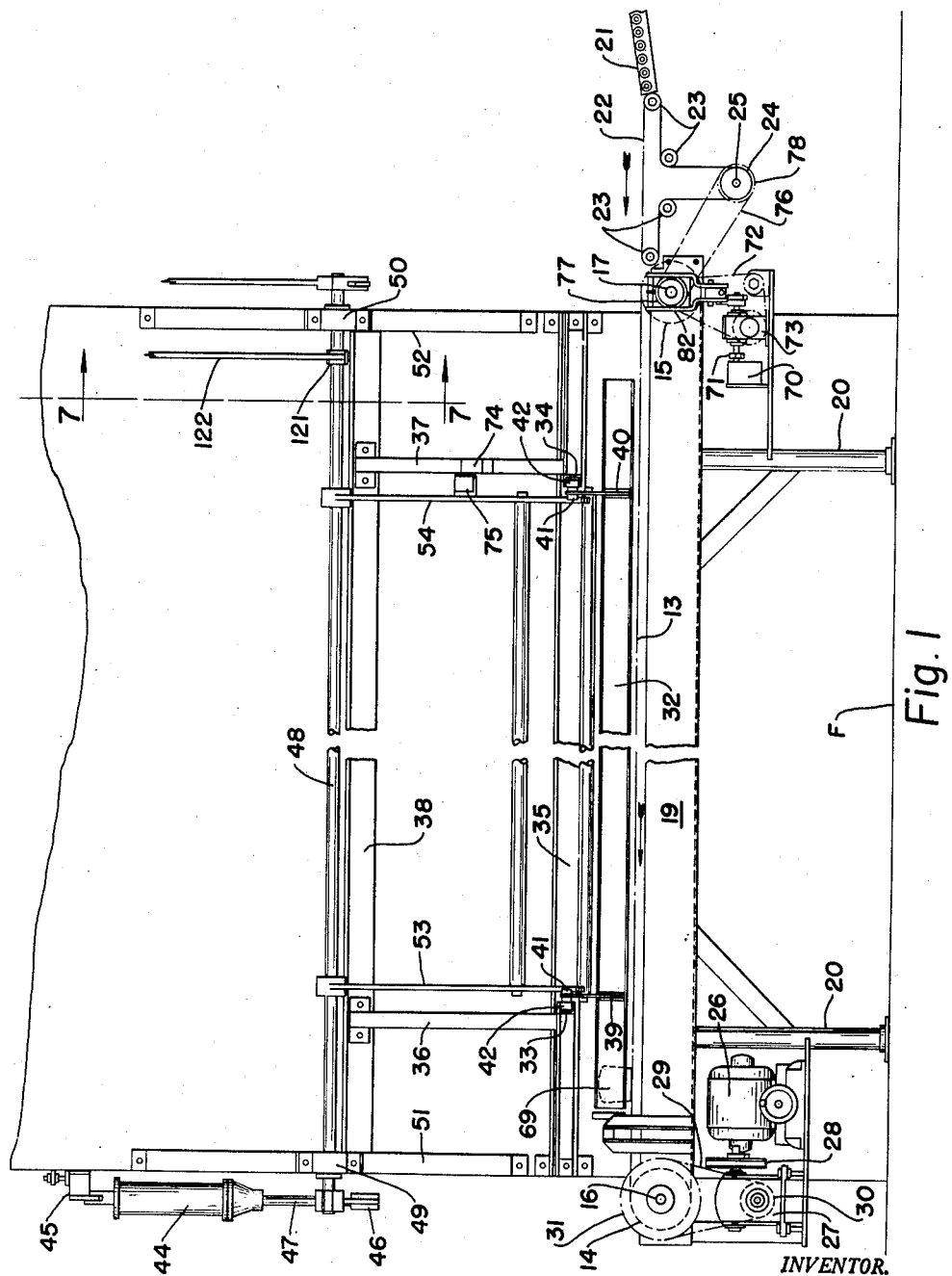
Figures 3, 9:
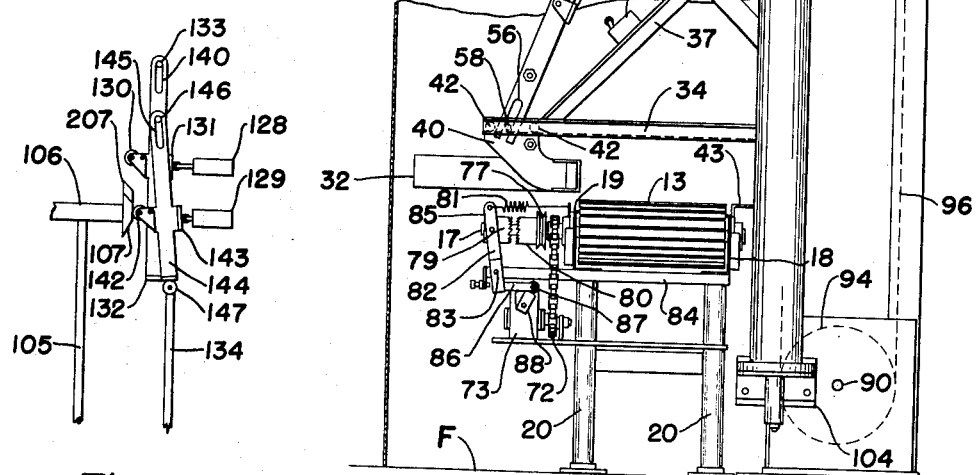
Figure 9 is a diagrammatic view of the valve operating means at the left hand side of Figure 5 and shown in a different operating position.
Figure 4:
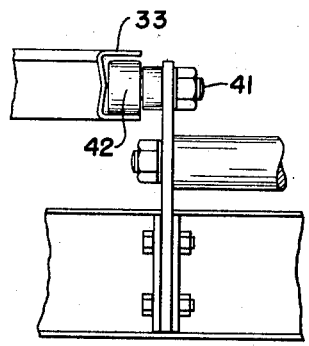
Figure 4 is an enlarged fragmentary elevational view showing the support and guide arrangement for the loading pusher of the invention.

Disposed in the lower portion of the chamber B is a transversely extending horizontal endless infeed conveyor 13, as shown in Figures 1, 2 and 3, onto which successive loaves are delivered and by which they are conveyed into the lower portion of the chamber B. The conveyor 13 is preferably arranged to project through the respective sides of the chamber B so that by suitable arrangement of the drive mechanism, the loaf feeding mechanism and other related equipment, the loaves may be delivered to the infeed conveyor 13 from either side of the cooler and conditioner. In the present instance, the arrangement is such that the loaves are delivered to the conveyor 13 from the right side of the apparatus as viewed in Figure 1, and the conveyor 13 is arranged to be driven with its top run traveling in the direction of the arrow in the same figure.

The conveyor 13 is trained over sprockets 14 and 15 mounted, respectively, on shafts 16 and 17. The shafts 16 and 17 are journaled in the opposite ends of a pair of spaced transversely extending frame members 18 and 19 supported in any suitable manner above the floor F, as by standards 20.

Hot loaves of bread from an oven (not shown), after being depanned are carried by a suitable conveyor in single file to a downwardly sloping gravity roller conveyor 21, Figure 1, which terminates opposite and spaced from the receiving end of the infeed conveyor 13. Between the roller conveyor 21 and the infeed conveyor 13 is an endless conveyor 22 trained over a plurality of guide rollers 23 including a driving roller 24 mounted on a shaft 25. The top run of the conveyor 22 is disposed in a horizontal plane with one end adjacent the discharge end of the gravity roller conveyor 21 and its opposite end adjacent the receiving end of the infeed conveyor 13. The conveyor 22 is arranged to be operated intermittently, as and for the purpose to be later explained, with its top run traveling in the direction of the arrow to deliver the loaves, received from the gravity roller conveyor 21, to the infeed conveyor 13.

The infeed conveyor 13 is also operated intermittently, as and for the purpose later described, and the motive power for the conveyors 13 and 22 is provided by the motor 26. Power is transmitted from the motor 26 to the conveyor 13, through a suitable gear reducer 27, by the belt 28 connecting the motor and gear reducer, and a sprocket chain 29 trained over a sprocket 30 on the gear reducer shaft and a sprocket 31 mounted on an extension of the conveyor shaft 16, as best shown in Figure 2.

The rate of travel and the intermittent operation of the conveyors 13 and 22 is related with the operation of a pusher member 32 arranged for reciprocation across the infeed conveyor 13 in a direction normal to the direction of travel of the conveyor 13 whereby a row of ten loaves is pushed off the conveyor 13. The pusher assembly will, therefore, be now described and the conveyor assembly will be adverted to later in the description.

Referring to Figures 1, 2, 3 and 4, a pair of transversely spaced longitudinally extending roller guide tracks 33 and 34 are disposed above the infeed conveyor 13. The guide tracks 33 and 34 are secured at their forward ends to a frame member 35 extending transversely of the chamber B. Near their rearward ends, the guide tracks 33 and 34 are supported by the sloping brackets 36 and 37, respectively, which are secured at their upper forward ends to a frame member 38 disposed above the frame member 35 and extending transversely of the chamber B.

The pusher member 32 is provided with a pair of transversely spaced upwardly projecting wings 39 and 40, each of which carries adjacent its upper edge a pair of laterally outwardly extending spaced stub shafts 41. Mounted on the outer ends of the stub shafts 41 are rollers 42 received in the guide tracks 33 and 34 whereby the pusher member 32 is pendently supported and movable forward and back across the infeed conveyor 13. The guide tracks 33 and 34 are of sufficient length to permit the pusher member on its forward stroke to push the row of loaves off the infeed conveyor 13 and across a bridge member 43 which bridges the space between the top run of the infeed conveyor 13 and an elevator E, to be later described; and on its retracted stroke to move to a position rearward of the infeed conveyor 13 to permit another row of loaves to be conveyed into the chamber B.

The motive means for reciprocating the pusher member 32 is preferably an air operated cylinder 44, though it is apparent that other means may be employed. The air operated cylinder 44 is pendently and pivotally supported by a bracket 45 mounted on the left side of the chamber B, as viewed in Figure 1. A connecting rod 46 has at one end a pivotal connection with the free end of the piston rod 47 of the cylinder 44 and at its other end a rigid connection with a transversely extending rotatably mounted rock shaft 48 whereby reciprocation of the piston rod 47 effects alternate clockwise and counter-clockwise rotation of the rock shaft 48. Rock shaft 48 is mounted in bearings 49 and 50 carried, respectively, by brackets 51 and 52 which are rigidly secured at opposite sides of the chamber B.

A pair of transversely spaced rocker arms 53 and 54 are connected at one end to the shaft 48 for movement therewith. At their opposite ends, the rocker arms 53 and 54 are provided, respectively, with elongated slots 55 and 56 arranged to engage pins 57 and 58, respectively, which are secured to and extend inwardly from the upper edge of the wings 39 and 40 of pusher member 32. Thus, as the shaft 48 turns, first in one direction and then in the other, the rocker arms 53 and 54 advance and retract the pusher member 32 across the infeed conveyor 13.

Referring to Figure 5, there is shown diagrammatically, a pair of lines 59 and 60 communicating at one of their respective ends with opposite ends of the cylinder 44 and arranged at their respective opposite ends through a four way valve 61, for selective communication with pressure supply line 62 and exhaust line 63. The four way valve 61 is conventional in design and need not be described. A cam 64, mounted on a shaft 65 operated by the motor 66, controls the actuation of the valve 61.

The valve 61 is normally in position to provide communication between the pressure supply line 62 and line 60 leading to the upper end of cylinder 44, and between exhaust line 63 and line 59 leading to the lower end of cylinder 44, whereby the pusher member 32 is retained in its retracted position. The cam shoulder 67 of cam 64 effects movement of the valve 61 from its normal position, to a position providing communication between the pressure supply line 62 and line 59, and between exhaust line 63 and line 60, whereby the pusher member 32 is advanced to push a row of loaves off the infeed conveyor 13 onto the elevator E. The dwell of the cam shoulder 67 is relatively short so that the valve 61 quickly returns to its normal position. As a result, the pusher member 32 is quickly returned to its retracted position where it is retained for a sufficient length of time for another row of loaves to collect on the infeed conveyor 13.

In actual practice, cam 64 is one of a bank of cams operated by the motor 66, for synchronously actuating various components of the bread cooler and conditioner, however, since they are not essential to an understanding of the present invention, they are not shown. While details of the cam, such as its dwell and its speed of rotation may be altered, it is preferred in the present instance and will hereinafter be considered for purpose of illustration, to make one complete revolution every twenty seconds. Thus, operation of the pusher member 32 is initiated every twenty seconds, and the dwell of the cam shoulder 67 is such that the advancing and retracting movement of the pusher member constitutes only a small fraction of the twenty second period, so that for the greater part of the twenty second period it is retained in its retracted position to permit a row of loaves to be collected on the infeed conveyor 13.

Reverting again to the conveyors 13 and 22, the drive therefor previously described, includes a variable speed pulley 68, Figure 2, and is adjusted so that the top run of the infeed conveyor 13 makes one travel in less than twenty seconds. By one travel is meant the distance required to convey the first of a row of loaves from the infeed end of conveyor 13, or the right hand end as viewed in Figure 1, to the position occupied by the loaf marked 69 in the same figure, thereby assuring disposition of a row of loaves in front of the pusher member 32.

In order to stop conveyor 13 when the first of a row of loaves has reached position 69, a normally closed limit switch 70 is arranged to open the circuit to motor 26. The means for actuating the switch 70 includes a cam 71 which is rotated from conveyor shaft 17 through appropriate sprocket and sprocket chain mechanism, indicated as a whole by the numeral 72, and gear reducer 73, so that cam 71 makes one complete revolution for each travel, as above defined, of the infeed conveyor 13. The motor 26 and infeed conveyor 13 remain stopped with a row of loaves on the conveyor 13 in position to be pushed off by the pusher member 32, until the latter has pushed off such row of loaves and is ready to return to its retracted position, as will now be described.

Mounted on one of the sloping brackets 36, 37, in the present instance on bracket 37, as shown in Figures 1 and 3, is a normally open limit switch 74 in circuit with the motor 26. The limit switch 74 is disposed in the path of a pivoted lug 75 mounted on the swinging pusher arm 54, and is so located as to be closed upon contact by the lug 75 on the return travel of the pusher member 32, whereby the motor 26 and conveyor 13 are restarted. On the forward stroke of the pusher member 32 the lug 75 pivots to pass freely over the arm of the limit switch 74, however, on the return stroke, a stop member prevents pivotal movement of the lug 75 over the switch arm, thereby effecting movement of the switch arm from its normally open position. The normally open limit switch 74 is, of course, only momentarily closed, but this is of sufficient duration to permit the cam 71 to be moved out of contact with normally closed limit switch 70, whereby the latter closes a circuit to the motor 26 permitting the infeed conveyor to run until cam 71 again opens normally closed switch 70.

It is important also that the individual loaves of the successive rows collected on the infeed conveyor 13 be spaced, and preferably uniformly spaced, in order that every side of each loaf be exposed for proper cooling and conditioning in their travel along the conveyor paths 10, 11 and 12. To accomplish this, the feeder conveyor 22 is operated at a slightly slower speed than the infeed conveyor 13. As best shown in Figure 1, the feeder conveyor 22 is operated from the infeed conveyor shaft 17 by means of a belt 76 trained over a pulley 77, Figure 3, mounted on an extension of shaft 17, and a pulley 78 mounted on an extension of the feeder conveyor drive shaft 25. The pulley 78 is slightly larger in diameter than the pulley 77 whereby feeder conveyor 22 travels at a slightly slower speed than infeed conveyor 13. The pulley 78 is preferably a variable speed pulley of any well known suitable type, whereby the relative speeds of infeed conveyor 13 and feeder conveyor 22 may be altered to obtain any desired spacing between the individual loaves of a row of loaves.

During the interval that operation of conveyors 13 and 22 is interrupted, as hereinbefore brought out, at which time the pusher member 32 is pushing a row of loaves off the infeed conveyor 13, a number of loaves will accumulate on the roller conveyor 21 adjacent the feeder conveyor 22. This insures having a supply of loaves on hand ready to be picked up by the feeder conveyor 22 each time operation thereof recommences.

Operation of feeder conveyor 22 and infeed conveyor 13 starts simultaneously. However, it is important that feeder conveyor 22 stops slightly before infeed conveyor 13 to permit the last loaf of a row to clear the side wall structure of the chamber B and to travel well into the chamber B in the path of the pusher member 32, thereby preventing crushing of the last loaf against the side wall structure as the pusher member 32 comes forward. This is conveniently accomplished through a clutch and cam arrangement which will now be described.

Referring to Figures 1 and 3, the clutch includes a driving member 79 mounted on the extended portion of conveyor shaft 17 for rotation therewith and for slidable movement axially therealong, and includes also a driven member 80 freely mounted on shaft 17. A spring 81 normally retains the clutch members 79 and 80 in engagement whereby the latter clutch member will rotate with conveyor shaft 17. The pulley 77, which as previously described forms part of the driving connection for actuating the conveyor 22, is rigidly secured with the driven clutch member 80.

The means for disengaging the clutch members 79 and 80 includes a clutch lever 82 pivotally mounted at 83 on a support member 84 carried by the frame members 18 and 19. The clutch lever 82 is provided with a yoke 85 arranged in well known manner to move the driving clutch member 79 axially along the shaft 17 while permitting it to rotate with shaft 17. While not shown, this may be conveniently accomplished by providing the yoke 85 with inwardly projecting pins or lugs which extend into a peripheral groove formed in the clutch member 79. The end of the clutch lever 82 opposite the yoke 85 carries a cam arm 86 provided at its free end with a cam follower 87 arranged to be engaged by a cam 88 mounted on one end of the shaft of the gear reducer 73, on the other end of which shaft is mounted the cam 71 for actuating the limit switch 70, as previously described. Upon engagement of the cam 88 with the cam follower 87, the cam arm 86 is moved in an upward arcuate path about the pivot 83, whereby the yoke 85 of the clutch lever 82 pulls the clutch member 79 out of engagement with clutch member 80, as shown in Figure 3, to interrupt operation of feed conveyor 22.

Cam 88 is so disposed on the shaft of the gear reducer 73 to function slightly in advance of cam 71, which latter cam, as previously described, through switch 70 interrupts operation of the motor 26. The dwell of cam 88 is such that the clutch members 79 and 80 are held out of engagement at least until the cam 71 causes the motor 26 to be stopped. Thus, the conveyor 22 is arranged to stop slightly before conveyor 13, and both conveyors will restart simultaneously, as before described, upon closing of switch 74 to close a circuit to motor 26.

Having described the means for introducing successive rows of spaced loaves into the chamber B and for pushing successive rows off the infeed conveyor 13 onto the elevator E, there will now be described the construction and operation of the elevator E.

The elevator E is disposed between the rearward ends of the tunnel conveyors 10, 11 and 12, and the forward side of the infeed conveyor 13, with the upper portion of the elevator adjacent the conveyors 10, 11 and 12, and the lower portion adjacent the infeed conveyor 13, as best shown in Figures 2 and 2A. The elevator E includes a pair of transversely extending shafts 89 and 90 suitably journaled in upright elevator side frame members and disposed, respectively, near the upper and lower ends of the chamber B.

Referring to Figures 2A and 3A, the upper elevator shaft 89 has mounted thereon at its opposite ends, sprockets 91 and 92, and referring to Figures 2 and 3, the lower elevator shaft 90 has mounted thereon at its opposite ends, sprockets 93 and 94. An endless chain 95 is trained over the sprockets 91 and 93 at one side of the elevator E and endless chain 96 is trained over sprockets 92 and 94 at the other side of the elevator E. Secured to one of the runs of each of the chains 95 and 96 are respective brackets 97, to which brackets are attached a plurality of vertically spaced transversely extending horizontal trays 99, 100 and 101. The trays should be the same in number as there are tunnel conveyors, and in the present instance, there being three conveyors 10, 11 and 12, three elevator trays 99, 100 and 101 are shown. The trays 99, 100 and 101 are spaced the same distance apart as the upper runs of the conveyors 10, 11 and 12 so that they may be alined therewith when in their up position, as shown in dot and dash lines in Figure 2A, and are of sufficient width to receive the row of loaves pushed off the infeed conveyor 13 by pusher member 32.

The motive means for raising and lowering the elevator trays is provided by an air operated cylinder 102, rigidly secured in an upright position to and at one side of the framework of chamber B, by suitable means as mounting brackets 103 and 104, best shown in Figure 3. On the free end of the piston rod 105 is secured a cross piece 106, Figures 3A and 5, one end of which carries a pair of transversely spaced cam members 107 and 207, the function of which will be described a little later on. The other end of the cross piece 106 is secured to one run of each of a pair of transversely spaced endless chains 108 trained over a pair of transversely spaced upper sprocket members 109 mounted on an extension of shaft 89 and a pair of transversely spaced lower sprocket members 110 mounted on a stub shaft 111 journaled in a bracket 112 at one side of the chamber B framework.

Thus, through the operating connections just described, reciprocation of piston rod 105 effects rotation of shaft 89 first in one direction and then in the opposite direction, and since, as previously explained, the elevator trays 99, 100 and 101 are operatively connected with the same shaft 89, they are alternately raised and lowered as a unit. The connection between the outer end of piston rod 105 and chains 108 and the connection between the elevator trays 99, 100, 101 and the elevator chains 95 and 96 are so disposed that at one limit of the stroke of piston rod 105, in the present instance its extended stroke, the elevator E is in its lowermost position with tray 99 at the level of or slightly below the level of the top run of infeed conveyor 13; while on the fully retracted stroke of piston rod 105, the elevator E is in its uppermost position with the trays 99, 100, 101 at the level of or slightly above the level of the top run of respective tunnel conveyors 10, 11, 12, as may be seen best by referring to Figures 2 and 2A.

By making the diameter of sprockets 109 half the diameter of the elevator sprockets 91, 92, the stroke of piston rod 105 is half the distance traveled by the elevator between its uppermost and lowermost positions, whereby a smaller cylinder may be employed than if the piston rod 105 were directly connected with the elevator chains 95, 96, resulting in conserving space, the expense of larger equipment and a saving in compressed air. The two to one ratio may of course be altered if desired.

Air for operating the elevator E is supplied from a suitable source to the upper and lower ends of the motor cylinder 102 through respective lines 113 and 114, arranged through four-way valve 115 to be alternate pressure and exhaust lines, as shown in Figure 5. The actuation of valve 115 is controlled by the operation of a ram 116, in a manner to be later described, and also by the operation of the pusher member 32 as will now be described.

Let it be assumed that the elevator has just completed its descent to the position as illustrated in the drawings. To effect such descent the four way valve 115 is forcibly retained by a cam 117 and a set toggle 118 in position to provide communication between pressure supply line 119 and line 114 leading to the lower end of cylinder 102, and to provide communication between exhaust line 120 and line 113 leading from the upper end of cylinder 102.

Figure 7:
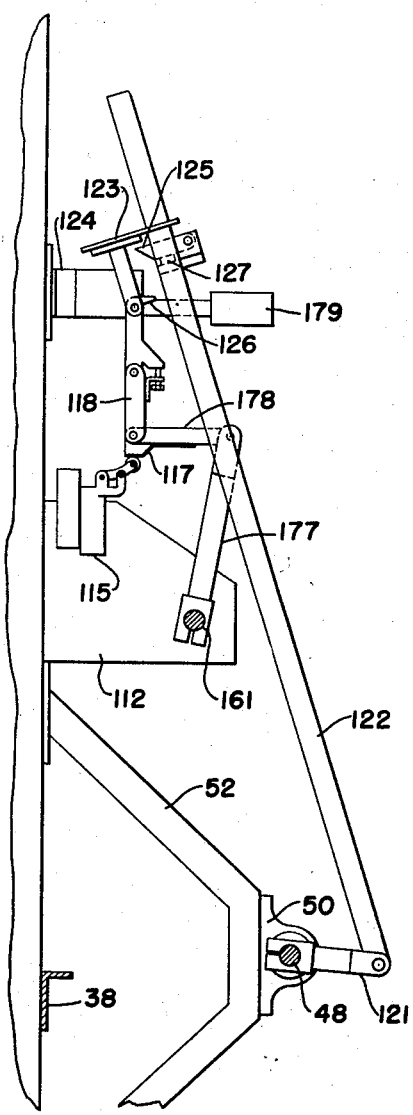
Figure 7 is a fragmentary sectional view of the invention taken on the line 7—7 and the upward extension thereof of Figure 1 and looking in the direction of the arrows.

The pusher member 32 now makes its forward stroke, as previously described, to push a row of loaves from the infeed conveyor 13 onto the elevator tray 99. The shaft 48, as viewed in Figures 5 and 7, is thus rotated in a clockwise direction. Secured to the right hand end of the shaft 48, as viewed in Figure 1, is a lever arm 121 to the free end of which is pivotally connected the lower end of a rod 122. The upper end of rod 122 is slidably supported in a bracket 123 which is pivotally carried by a bracket 124 rigidly secured to a stationary framework member. Near its upper end, the rod 122 carries a pivoted pawl 125 which, upon clockwise rotation of shaft 48 and consequent downward movement of rod 122, will engage a lug 126 on set toggle 118. Due to its pivotal mounting, the pawl will thus freely pass by the lug 126 to a position therebeneath.

Now, on the retracting or rearward stroke of the pusher member 32, the shaft 48 will turn in a counterclockwise direction, moving the rod 122 and pawl 125 in an upward direction. The pawl 125, because of the stop member 127, can not now, upon engagement with lug 126, freely pass by it but does so only upon breaking the hingedly mounted toggle 118. Upon breaking of the toggle 118, the spring pressed valve 115 is then free to move to a position reversing the flow of air in the lines 113 and 114. The line 113 now becomes the pressure line and line 114 the exhaust line, whereby the elevator will move in an upward direction.

In its upward travel, it is necessary to successively stop the elevator when the trays 100 and 101 are in alinement with the infeed conveyor 13 in order that they may receive a row of loaves. This stopping of the elevator is accomplished through a pair of two way valves 128 and 129, as best shown in Figures 3A, 5 and 8.

With the elevator moving in an upward direction, the piston rod 105 and cams 107 and 207 carried thereby move in a downward direction, as previously explained. In descending, the cam 207 engages a pawl 130 carried by the trip member 131, which in turn is carried by the lever 132. The lever 132 is pivotally supported at its upper end, as at 133, Figure 8, on a stationary frame-like structure 134.

Engagement of the cam 207 with the pawl 130 causes the trip member 131 to change the position of valve 128, closing both lines 113 and 114 and also moves the pivotally mounted lever 132 to the position shown in Figure 9. Flow of pressure to the upper end of cylinder 102 and exhaust of pressure from the lower end thereof, is thus cut off and the elevator will stop. The valve 128 is so located that it will be actuated by the cam 207, when the elevator tray 100 is in alinement with infeed conveyor 13. By cutting off both the pressure and exhaust lines to the cylinder 102, thereby equalizing the pressure in both ends of the cylinder, the elevator trays are retained in perfect alinement with the infeed conveyor 13 with no tendency to creep.

On the next forward movement of the pusher member 32 whereby a row of loaves is pushed onto elevator tray 100, an upwardly extending unbalanced rod 134 is, through lever 135 which is secured at one end for movement with shaft 48 and pivotally connected at its other end, as at 136, with the lower end of rod 134, pulled downwardly to bring the roller 137 beneath the lower end of the valve controlling lever 132. A roller stop member 138 mounted in a guide 139 for the rod 134 limits the pivotal movement of unbalanced rod 134, to position it as shown in Figure 9.

On the retracting stroke of the pusher member 32, the rod 134 will move upwardly and its roller 137 will engage the bottom of lever 132. The lever 132, by reason of the slot 140 at its pivoted upper end, see Figures 5 and 9, is therefore also moved in an upward direction, whereby pawl 130 is disengaged from cam 207, whereupon the spring pressed valve 128 reassumes a position opening the pressure line 113 and exhaust line 114. The cam 141 of rod 134, upon engagement with roller 138 effects disengagement of the roller 137 at the upper end of rod 134 from the lower end of lever 132, and the lever 132 is free to drop down to its original position as in Figure 3A.

The elevator will then rise and it is again stopped when the lowermost tray 101 is alined with infeed conveyor 13. The means and the operation thereof to stop the elevator in such position and to restart it is similar to the means described just above for stopping and starting the elevator when tray 100 is in alinement with infeed conveyor 13 and need not be described in detail. In so stopping the elevator, the cam 107 engages pawl 142 carried by the trip member 143, which in turn is carried by lever 144. The lever 144 is also provided with a slot 145, Figure 5, adjacent its upper pivoted end 146, Figure 8, whereby the lever 144 is movable upwardly upon engagement of roller 147 with the bottom of lever 144 as shown in Figure 9.

In order to permit the cams 207 and 107 to pass the pawls 130 and 142, respectively, on the upward stroke of the piston rod 105, which is the downward travel of the elevator, without affecting the position of valves 128 and 129, the pawls 130 and 142 are pivotally mounted to pivot in an upward arc from the position shown in Figures 3A and 5 out of the path of travel of the cams. Suitable stop means, not shown, normally retains the pawls in the positions shown in Figures 3A and 5.

With the elevator trays 99, 100 and 101 now each filled with a row of loaves, they will ascend to their uppermost position, whereupon ram 116 will function to push the rows of loaves from the trays onto the tunnel conveyors 10, 11 and 12.

The ram 116 and its operation will now be described, with particular reference to Figures 2A, 3A and 5. The ram 116 is provided with a plurality of horizontal, vertically spaced pusher members 150, 151 and 152 extending transversely within chamber B and being of sufficient width to engage the rows of loaves on the elevator trays 99, 100 and 101. The number of pusher members corresponds to the number of elevator trays and tunnel conveyors, in the present instance three, and are spaced the same distance apart as are the elevator trays 99, 100 and 101.

Figure 6:
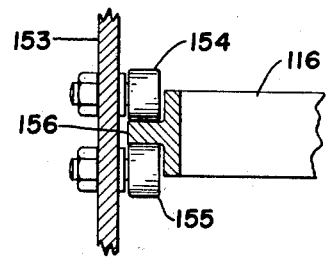
Figure 6 is an enlarged fragmentary view of the unloading pusher and its roller guide support, with parts shown in section.

The ram 116 is mounted for reciprocating fore and aft movement, so that as it moves forward from its rearmost position, as shown in Figure 2A, the pusher members 150, 151 and 152 will push the rows of loaves off elevator trays 99, 100 and 101, when the elevator is in its uppermost position as shown in dot and dash lines, and onto the tunnel conveyors 10, 11 and 12. The mounting for the ram 116 includes brackets 153 secured to the opposite side frame members of the elevator E. Each of the brackets 153 is provided on its inner side with a pair of longitudinally spaced upper rollers 154 and a pair of similarly longitudinally spaced lower rollers 155. The upper rollers 154 and the lower rollers 155 are spaced apart and cooperate to form ways for receiving longitudinally extending flanges 156 formed with and projecting laterally from the sides of the ram 116, one pair of rollers and the flange on one side of the ram being shown in Figure 6. The rollers thus form a support and guide for permitting fore and aft movement of the ram 116.

The motive means for reciprocating the ram 116 is provided by an air operated cylinder 157 which is pivotally mounted at one end on a bracket 158 secured to one side of the frame of the elevator E. A connecting rod 159 has at one end a pivotal connection with the free end of the piston rod 160 of the cylinder 157 and at its other end a rigid connection with a transversely extending shaft 161 journaled in the brackets 45 (Figure 2) and 112 (Figure 3), whereby oscillating motion is imparted to the shaft 161. Secured to the opposite ends of shaft 161 for oscillation therewith are a pair of arms 162 (Figures 2, 2A) and 163 (Figures 3, 3A). The free ends of the arms 162 and 163 are provided, respectively, with elongated slots 164 and 165 arranged to engage pins 166 and 167, respectively, which are secured to and extend laterally inward of the opposite sides of the ram 116. Thus, as the shaft 161 turns, first in one direction and then in the other, the arms 162 and 163 advance and retract the pusher members 150, 151 and 152 of the ram 116 across the respective elevator trays 99, 100 and 101 to periodically push the rows of loaves from the elevator trays onto the tunnel conveyors 10, 11 and 12.

Referring to Figure 5, there is shown diagrammatically, a pair of lines 168 and 169 communicating at one of their respective ends with opposite ends of the cylinder 157 and arranged at their respective opposite ends through a four-way valve 170 mounted on bracket 153 (see Figure 2A), for selective communication with pressure supply line 171 and exhaust line 172. The four way valve 170 is conventional in construction and is, therefore, not described. The means controlling the functioning of valve 170 will now be described in detail.

With the elevator trays 99, 100, 101 in their down position, as shown in Figure 2, the valve 170 is spring pressed in a position to provide communication between the pressure supply line 171 and line 169 leading to the rear of cylinder 157, whereby the ram 116 is retained in its retracted position. Now, when the elevator trays move to their up position, as shown in dot and dash lines in Figure 2A, a cam arm 173 carried by the elevator tray unit engages the upper end of a lever means 174 pivotally supported on bracket 153, whereby the lower end of lever means 174 effects movement of the valve 170 from its normal position, to a position providing communication between the pressure supply line 171 and line 168, and between exhaust line 172 and line 169. In this latter position of the valve, the motive cylinder 157 will function to advance the ram 116 in order, as previously described, to push the rows of loaves from the trays 99, 100 and 101 onto the tunnel conveyors 10, 11 and 12.

At the completion of the advancing or forward stroke of the ram 116, a trip member 175 carried by the ram 116 engages and breaks a toggle 176 which is carried by the elevator tray unit. The toggle 176 is pivotally connected to the free end of the cam arm 173, while the other end of the cam arm 173 is pivotally connected to the elevator tray unit. In the set position of the toggle 176, the cam arm 173 is supported in a vertical position to engage the upper end of lever means 174, as previously described. Now, when the toggle 176 is broken on the forward stroke of the ram 116, the cam arm 173 is pulled pivotally away from engagement with the upper end of lever means 174, and spring pressed valve 170 is permitted to return to its normal position, thereby reversing the operation of the cylinder 157 and causing the ram 116 to be retracted to its normal position.

Figure 10:
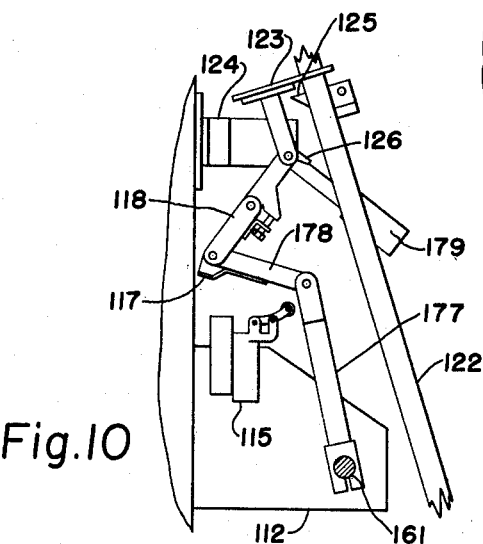
Figure 10 is a fragmentary sectional view showing the linkage of Figure 7 in a different operating position.

Also on the forward stroke of the ram 116, the shaft 161, which turns in a counterclockwise direction as viewed in Figures 5 and 7, swings the toggle 118 about its pivotal connection with bracket 124 to the position shown in Figure 10 through a linkage arrangement. This linkage includes a lever 177 securely connected with shaft 161 for rotation therewith, and a link 178 pivotally connected at one end with the lower end of toggle 118 and pivotally connected at its opposite end with the free end of lever 177.

In Figure 7 the toggle 118 is shown in its set position to conform with the position of the elevator in its lowermost position. However, it will be recalled from the previous description, that the toggle 118 was broken by the first retracting stroke of the pusher member 32. Thus, at the time that linkage 177, 178 moves the toggle 118 to the position shown in Figure 10, the toggle is actually broken and remains broken until the cam 117 disengages from spring pressed valve 115. As soon as cam 117 is disengaged from the spring pressed valve 115, the counterweight 179 sets the toggle 118 as shown in Figure 10.

The ram 116 having completed its function of pushing the rows of loaves from the elevator trays onto the tunnel conveyors, the elevator tray unit is ready to descend to its lowermost position, and this is automatically accomplished in the following manner.

On the retracting or rearward stroke of the ram 116, the shaft 161 turns in a clockwise direction as viewed in Figures 5 and 7. Through linkage 177, 178, the now set toggle is moved from the position shown in Figure 10 to the position shown in Figure 7. The cam 117 thereupon engages the valve 115 changing its position to connect line 114 with pressure supply line 119 and line 113 with exhaust line 120, whereupon the elevator will descend.

It will be seen from the above description that we have provided a completely automatic loading means, the various elements of which are synchronized in their operation with the operation of the pusher member 32.

The apparatus though consisting of a plurality of functioning mechanisms, is in reality a single machine, since the various mechanisms are coordinated in action, the functioning of one mechanism initiating and controlling the functioning of another mechanism to maintain a repetitive cycle of timed relation operations. Thus, rotation of cam 64 controls reciprocation of pusher bar 32, which in turn controls starting and stopping of conveyors 13 and 22, and reciprocation of the elevator; and reciprocation of the elevator and pusher bar 32 control reciprocation of the ram 116. Failure of any one of the motions to complete its intended operation, brings about automatic stoppage of the next succeeding motion, thereby protecting against damage of the articles being handled and against breakage of the mechanism.

Except for the rate of operation of the conveyors 13 and 22 which are operated by a separate motor and which can be suitably adjusted through the variable speed pulleys, the operation of the other mechanisms are automatically maintained in timed relation without any adjustment being required, upon change in the rate of operation of the prime mover.

This application is a division of our co-pending application filed November 15, 1951, Serial No. 256,436, now Patent No. 2,741,384.

We claim:

1. Article feeding and spacing mechanism comprising, a first conveyor for conveying articles in an unbroken row, a second conveyor for receiving successive articles from said first conveyor, actuating means for operating said second conveyor, a drive connection between said conveyors for operating said first conveyor at a slower speed than said second conveyor to space articles on said second conveyor, said drive connection including a variable speed means for selectively varying the slower speed of said first conveyor with respect to the faster speed of said second conveyor, and means operatively connected with said second conveyor responsive to a predetermined linear travel thereof for interrupting operation of said actuating means to collect on said second conveyor a predtermined number of spaced articles in predetermined spaced relation.

2. Article feeding and spacing mechanism comprising, a first conveyor for conveying articles in an unbroken row, a second conveyor for receiving successive articles from said first conveyor, actuating means for operating said second conveyor, a drive connection between said conveyors for operating said first conveyor at a slower speed than said second conveyor to space articles on said second conveyor, said drive connection including a variable speed means for selectively varying the slower speed of said first conveyor with respect to the faster speed of said second conveyor, a rotatably mounted cam operatively connected with said second conveyor to make one complete revolution for a predetermined linear travel of said second conveyor, and means responsive to said cam at the end of a complete revolution thereof for interrupting operation of said actuating means to collect on said second conveyor a predetermined number of spaced articles in predetermined spaced relation.

3. Article feeding and spacing mechanism comprising, a first conveyor for conveying articles in an unbroken row, a second conveyor for receiving successive articles from said first conveyor, actuating means for operating said second conveyor, a drive connection between said conveyors for operating said first conveyor at a slower speed than said second conveyor to space articles on said second conveyor, said drive connection including a variable speed means for selectively varying the slower speed of said first conveyor with respect to the faster speed of said second conveyor, said drive connection also including a normally engaged clutch, a first means operatively connected with said second conveyor responsive to a predetermined linear travel thereof for interrupting operation of said conveyor actuating means to collect on said second conveyor a predetermined number of spaced articles in predetermined spaced relation, and a second means operatively connected with said second conveyor for disengaging said clutch slightly in advance of actuation of said first means whereby to stop said first conveyor slightly in advance of said second conveyor.

4. Article feeding and spacing mechanism comprising, a first conveyor for conveying articles in an unbroken row, a second conveyor for receiving successive articles from said first conveyor, actuating means for operating said second conveyor, a drive connection between said conveyors for operating said first conveyor at a slower speed than said second conveyor to space articles on said second conveyor, said drive connection including a variable speed means for selectively varying the slower speed of said first conveyor with respect to the faster speed of said second conveyor, said drive connection also including a normally engaged clutch, a pair of rotatably mounted cams operatively connected with said second conveyor to make one complete revolution for a predetermined linear travel of said second conveyor, means responsive to one of said cams at the end of a complete revolution thereof for interrupting operation of said conveyor actuating means to collect on said second conveyor a predetermined member of spaced articles in predetermined spaced relation, and the other of said cams being disposed with respect to said first cam to disengage said clutch slightly in advance of actuation of said first cam whereby to stop said first conveyor slightly in advance of said second conveyor.

References Cited in the file of this patent

UNITED STATES PATENTS

| 1,117,433 | Owens | Nov. 17, 1914 |
| 1,355,488 | McKenney | Oct. 12, 1920 |
| 1,492,864 | Straight | May 6, 1924 |
| 1,697,220 | Anstiss | Jan. 1, 1929 |
| 2,006,870 | Neuman | July 2, 1935 |
| 2,736,417 | Greer | Feb. 28, 1956 |

FOREIGN PATENTS

| 609,844 | Great Britain | Oct. 7, 1948 |